(12) United States Patent
Totsu

(10) Patent No.: US 6,886,433 B2
(45) Date of Patent: *May 3, 2005

(54) COMBINATION OF SCREW AND SCREW DRIVER BIT AND HEADER PUNCH FOR ITS MANUFACTURE

(76) Inventor: Katsuyuki Totsu, 32-13, Oshiage 1-chome, Sumida-Ku, Tokyo 131-0045 (JP)

( * ) Notice: Subject to any disclaimer, the term of this patent is extended or adjusted under 35 U.S.C. 154(b) by 17 days.

This patent is subject to a terminal disclaimer.

(21) Appl. No.: 10/149,997

(22) PCT Filed: Dec. 25, 2000

(86) PCT No.: PCT/JP00/09199
§ 371 (c)(1),
(2), (4) Date: Jun. 11, 2002

(87) PCT Pub. No.: WO01/50028
PCT Pub. Date: Jul. 12, 2001

(65) Prior Publication Data
US 2003/0002952 A1 Jan. 2, 2003

(30) Foreign Application Priority Data
Jan. 6, 2000 (JP) ........................................ 2000-000673

(51) Int. Cl.$^7$ ................................................ B25B 23/00
(52) U.S. Cl. ........................... 81/460; 81/436; 411/404
(58) Field of Search ............................. 81/436, 460, 461; 411/403, 404

(56) References Cited

U.S. PATENT DOCUMENTS

| | | | |
|---|---|---|---|
| 2,216,381 A | | 10/1940 | West et al. |
| 4,084,478 A | * | 4/1978 | Simmons ..................... 411/404 |
| 6,341,546 B1 | * | 1/2002 | Totsu ........................... 81/460 |
| 6,378,406 B1 | * | 4/2002 | Totsu ........................... 81/460 |
| 6,393,953 B1 | * | 5/2002 | Totsu ........................... 81/460 |
| 6,584,876 B2 | * | 7/2003 | Totsu ........................... 81/460 |

FOREIGN PATENT DOCUMENTS

| | | |
|---|---|---|
| JP | 48-1552 | 1/1973 |
| JP | 49-21720 | 6/1974 |
| JP | 52-032454 | 3/1977 |
| JP | 56-44208 | 4/1981 |
| JP | 3-292407 | 12/1991 |
| JP | 08-145024 | 6/1996 |

* cited by examiner

*Primary Examiner*—James G. Smith
(74) *Attorney, Agent, or Firm*—Jordan and Hamburg LLP

(57) ABSTRACT

A combination of a screw and a screw driver bit and a header punch for its manufacture capable of effectively preventing a come-out phenomenon of the screw driver bit by improving the structure of a groove part in a cross groove part in a cross groove of a screw to prevent a conventional damage.

8 Claims, 8 Drawing Sheets

F I G. 5
(a)
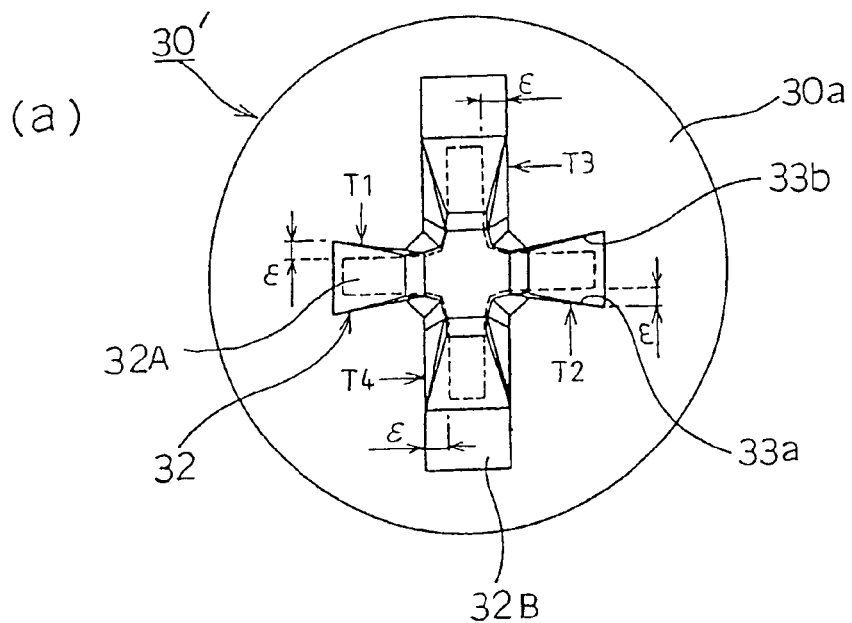
(b)
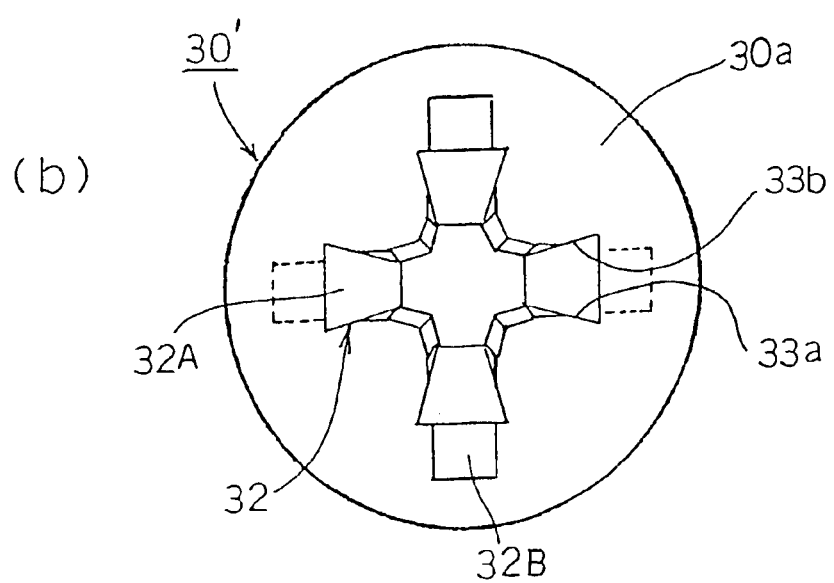

COMBINATION OF SCREW AND SCREW DRIVER BIT AND HEADER PUNCH FOR ITS MANUFACTURE

TECHNICAL FIELD

The present invention relates to a screw, a screw driver bit to be applied to the screw, and a header punch for manufacturing the screw. More particularly, it relates to a combination of a screw and a screw driver bit that ensures tight fitting of the bit-fitting groove of cross groove formed in the screw head, and the screw driver bit to fit into the bit-fitting groove, and can rapidly and securely achieve the attaching and detaching of the screw always by proper torque transmission, and a header punch for the manufacture of the screw.

BACKGROUND ART

A conventional general combination of a screw and a screw driver bit, which is configured as shown in FIGS. 12 to 15, is known. That is, FIGS. 12 and 13 show a conventional screw having a cross groove, FIG. 14 shows a screw driver bit for this cross-grooved screw, and FIG. 15 shows the state of fitting of the above-described screw and the screw driver bit.

The conventional screw 10 shown in FIG. 12 is provided, on a screw head part 10a thereof, with a cross groove 12. This cross groove 12 is configured in such a manner that a specified tilted groove part 12a is formed in the direction from each end edge part so as to extend to the center part of a screw neck part 10b and, at the same time, in the bottom part thereof is formed a roughly conical bottom face 14 with a gentle inclination. Incidentally, in FIG. 12, reference numeral 13 each denotes a tapered side wall part formed between adjacent cross grooves 12. That is, the cutting-edge part of a screw driver bit, which will be described later, abuts and engages with this tapered side wall part 13. Furthermore, in the adjacent corner parts of each of the above-described tilted groove parts 12a are formed taper connection faces 17a, 17b, which extend from the position of the conical bottom face 14 to the opening edge part of the cross groove 12 of the screw head part 10a and also against these taper connection faces 17a, 17b abuts and engages a portion of the cutting-edge part of a screw driver bit, which will be described later.

On the other hand, a conventional screw driver bit 20 shown in FIG. 14 is configured in such a manner that the screw driver bit is provided with cutting-edge parts 22, each of which fits into the respective cross grooves 12 of the above-described screw 10, and there are formed extended cutting-edge parts 22a, each of which extends so as to match the shape of the tilted groove parts 12a formed in the direction from the end edge parts of the above-described cross groove 12 to the center part of the screw neck part 10b. Incidentally, in FIG. 14, reference numeral 23 denotes tapered side wall parts formed on both side faces of each of the above-described cutting-edge parts 22 and extended cutting-edge parts 22a. That is, these tapered side wall parts 23 abut and engage against the tapered side wall parts 13 formed in the cross groove 12 of the above-described screw 10.

According to a combination of the conventional screw 10 and screw driver bit 20 thus configured, as shown in FIG. 15, by causing the screw 10 and the screw driver bit 20 to fit into each other, as described above, each of the cutting-edge parts 22 of the screw driver bit 20 and each of the extended cutting-edge parts 22a fit into the tilted groove parts 12a of the cross groove 12 and the side wall parts 23 of the above-described cutting-edge parts 22 and extended cutting-edge parts 22a abut against the tapered side wall parts 13 in the cross groove 12 of the screw 10. Therefore, by rotating the screw driver bit 20, a prescribed torque can be transmitted to the screw 10. That is, it is possible to perform the attaching and detaching of the screw in a specified object to be mounted.

However, according to the combination of the conventional screw 10 and screw driver bit 20 configured as mentioned above, as shown in FIG. 15, the cross groove 12 of the screw head part 10a has a specified tilted groove part 12a which is formed in the direction from the end edge part of the cross groove to the center part of the screw neck part 10b and, on the other hand, the screw driver bit 20 which fits into the screw is configured in such a manner that the ridgeline part of the extended cutting-edge part 22a matches the shape of the above-described tilted groove part 12a and fits into the above-described cross groove 12 and, furthermore, this ridgeline part of the extended cutting-edge part 22a is formed in such a manner that the width increases gradually in the direction from the leading end thereof to the rear. In addition, also the tapered side wall part 23 formed in each cutting-edge part 22 of the screwdriver bit 20 abuts and engages with the tapered side wall part 13 formed in the cross groove 12 of the screw 10. Therefore, when the above-described screw driver bit 20 is rotated in a prescribed direction, the resulting contact between the above-described screw driver bit 20 and the cross groove 12 is such a state that can be said to be totally tapered contact, with the result that the leading end of the screw driver bit 20 tends to come out along the inclined plane of the tilted groove part 12a of the above-described cross groove 12 (indicated by an arrow in FIG. 15), leading to the occurrence of what is called a come-out phenomenon.

In particular, the shape of the cross groove 12 of the conventional screw 10 is such that, as shown in FIG. 13, in order to facilitate the fitting of the leading end of the screw driver bit 20, the groove width of the cross groove 12 is formed in a larger size than the width of the ridgeline part of the extended cutting-edge part 22a of the screw driver bit 20, whereas the areas of the tapered side wall part 13 and taper connection faces 17a, 17b formed in the boundary parts between adjacent cross grooves 12, 12 and in the corner parts thereof are relatively small. For this reason, when by the rotating operation of the above-described screw driver bit 20 large loads are applied to the above-described tapered side wall parts 13 and taper connection faces 17a, 17b and the screw tightening resistance is large, the above-described tapered side wall part 13 and taper connection faces 17a, 17b are gradually damaged as indicated by shaded portions 15 in FIG. 13. Therefore, if these damaged portions (shaded portions 15) are expanded, the occurrence of the come-out phenomenon of the above-described screw driver bit 20 becomes frequent, eventually making a screw tightening operation impossible.

Incidentally, the occurrence of this come-out phenomenon brings about the drawback that the cutting-edge part at the leading end of the screw driver bit is worn, for example, in the case of a tapping screw, because the design surface hardness of this screw is high. Also, in the case of a clutch-type automatic screw driver having a torque control function, there is a drawback that when the come-out phenomenon occurs during screw tightening, the operator cannot judge whether the screw has been securely attached with an appropriate torque.

In order to prevent the come-out phenomenon of the above-described screw driver bit 20 from these standpoints, in the rotation of the screw driver bit 20 it is necessary to apply a thrust which strongly pushes the screw driver bit against the screw groove 12a. However, although there is no problem when the object to which the screw is to be attached is a rigid body such as metal, in the case of a precision component etc. there is a drawback that these objects are damaged.

Also, the occurrence of the come-out phenomenon accelerates the wear of the leading end parts of the bit, i.e., the cutting-edge part 22 and extended cutting-edge part 22a, and the wear of these parts further promotes the occurrence of the above-described come-out phenomenon, with the result that there is a drawback that the damage to the screw groove also increases.

Furthermore, although it is possible to prevent the above-described come-out phenomenon by applying an excessive thrust to the above-described screw driver bit 20, on the other hand an accurate torque cannot be transmitted to the screw and the magnitude of torque applied to the screw driver bit 20 differs from operator to operator, with the result that there is a drawback that variations occur in the screw tightening torque.

On the other hand, when screw tightening is manually performed, it costs the operator great labor and fatigue to perform the operation of rotating the screw driver bit 20, with the screw driver bit being sufficiently pushed against the screw.

Also, according to the combination of the above-described conventional screw 10 and screw driver bit 20, when screw attaching is performed by use of a manual tool or motor-driven tool, in the fitting of the leading end parts of the bit into the screw groove it is difficult to perform the rotating operation of the screw while keeping the axis of the screw and the axis of the screw driver bit in a coaxial state. Therefore, when there is an inclination between the axis of the screw and the axis of the screw driver bit, there is a drawback that the above-described come-out phenomenon occurs frequently and that besides the damage to the screw groove also occurs frequently, thereby reducing the working efficiency of screw tightening operation and, at the same time, incurring waste of expenses caused by the consumption of damaged screws.

Moreover, also in the screw detaching work, the same come-out phenomenon and damage to the screw groove are apt to occur and, in this case, the detaching of the screw becomes impossible and hence it becomes unavoidable to break a portion of the object to which the screw is attached. In particular, in the case of occurrence of the clogging of the interior of the screw groove with dust and the like, the occurrence of the above-described situation becomes remarkable and, for example, there is a drawback that separation work for the recycling of waste materials involving the detaching of the screw becomes complicated.

Accordingly, the present inventors devoted themselves to conducting a series of research and trial manufacture and, as a result, found out that, in a screw which is formed so that a bit-fitting groove formed of a cross groove is provided in a screw head part, a specified tilted groove part is formed in the direction from the end edge part of the bit-fitting groove to the center part of a screw neck part, and a roughly conical bottom face is formed at a cross center part, by forming the end edge part of the above-described bit-fitting groove as a generally vertical end wall part of a specified depth, by forming a groove part with an inclination angle β of about 45° in the direction from the lower edge part of the end wall part to the conical bottom face at the center part of the screw neck part, and further by forming the conical bottom face with a gentle inclination angle α of approximately 28°, it is possible to securely prevent the come-out phenomenon of the screw driver bit during the fitting of the screw driver bit into the screw groove, to substantially reduce damage to the screw by increasing the strength of the screw, and besides to achieve well-balanced torque transmission to the screw.

It is therefore the object of the invention to provide a combination of a screw and a screw driver bit in which by improving the structure of a groove part in a cross groove of the screw, damage to the screw as in a conventional screw is prevented by effectively preventing the come-out phenomenon of the screw driver bit and in which even if the cross groove part of the screw is damaged, a proper and rapid screw tightening operation can always be achieved and the working efficiency can be remarkably increased, and a header punch for manufacturing the screw.

DISCLOSURE OF THE INVENTION

In order to achieve the above-described object, the screw related to the invention is a screw which is formed so that a bit-fitting groove formed of a cross groove is provided in a screw head part, a specified tilted groove part is formed in the direction from the end edge part of the bit-fitting groove to the center part of a screw neck part, and a roughly conical bottom face is formed at a cross center part, which is characterized in that the end edge part of the above-described bit-fitting groove is formed as a generally vertical end wall part of a specified depth, that a groove part with an inclination angle β of about 45° is formed in the direction from the lower edge part of the end wall part to the conical bottom face at the center part of the screw neck part, and further that the conical bottom face is formed with a gentle inclination angle α of approximately 28°.

In this case, the tilted groove part with an inclination angle β of about 45°, which is formed in the direction from the lower edge part of end edge part of the above-described bit-fitting groove to the conical bottom face at the center part of the screw neck part, can be configured in such a manner that the tilted groove part is bulged inward to the bit-fitting groove in curved form.

Also, grooves with a width generally widening toward the end can be formed from the center part of the above-described screw head part outward in the radial direction so that the opening angle of opposed side wall parts of each of said adjacent grooves is a little sharper than a right angle.

Furthermore, a screw driver bit to be applied to the above-described screw related to the invention is provided, at the leading end thereof, with a flat cutting-edge part in which is formed a generally vertical end edge part that fits along a generally vertical end wall part of a bit-fitting groove of a screw head part, and the leading end face of this cutting-edge part is formed as a conical projection having an inclination angle of about 1° to 45° with respect to a horizontal plane so as to fit into the above-described screw.

In this case, wall parts on both sides at the leading end of the above-described flat cutting-edge part can be configured in a shape with a width widening toward the end so as to fit into the bit-fitting groove of the screw formed with a width generally widening toward the end, the bit-fitting groove of the screw being formed from the center part of the screw neck part outward in the radial direction.

Furthermore, the header punch for manufacturing the above-described screw related to the invention is provided with projecting pieces for forming the generally vertical end wall part and the tilted groove part with an inclination angle β of about 45° in the end edge part of bit-fitting groove of the screw head part and has a conical projection for forming the conical bottom face with a gentle inclination angle α of about 28° in the direction from these projecting pieces to the center part of the screw neck part.

BRIEF DESCRIPTION OF THE DRAWINGS

FIG. 5(a) is a plan view of the head part of a screw which shows a further embodiment related to the invention;

FIG. 5(b) is a plan view of the head part of a screw which shows an example of modification of FIG. 5(a);

(Description of Symbols)

| | |
|---|---|
| 30 | Screw |
| 30' | Plus-and-minus screw |
| 30a | Screw head part |
| 30b | Screw neck part |
| 32 | Bit-fitting groove |
| 32A, 32B | Groove of plus-and-minus screw |
| 32a | End edge part |
| 32a' | Lower edge part |
| 32b | Tilted groove part |
| 32b' | Bulge in curved form |
| 33 | Side wall part |
| 33a, 33b | Groove with a width widening toward the end |
| 34 | Conical bottom face |

-continued (Description of Symbols)

| | |
|---|---|
| 37a, 37b | Taper connection face |
| 40 | Header punch |
| 42 | Projecting piece |
| 42a, 42b | Tilted edge part |
| 44 | Conical projection |
| 50 | Screw driver bit |
| 52 | Flat cutting-edge part |
| 53 | Side wall part |
| 53a, 53b | Side wall part with a width widening toward the end |
| 54 | Conical projection |
| 54a | Concavity in curved form |

BEST MODE FOR CARRYING OUT THE INVENTION

Next, embodiments of a combination of a screw and a screw driver bit related to the invention and a header punch for its manufacture will be described below by referring to attached drawings.

EXAMPLE 1

(Example of Structure of Screw 1)

Figure 1:
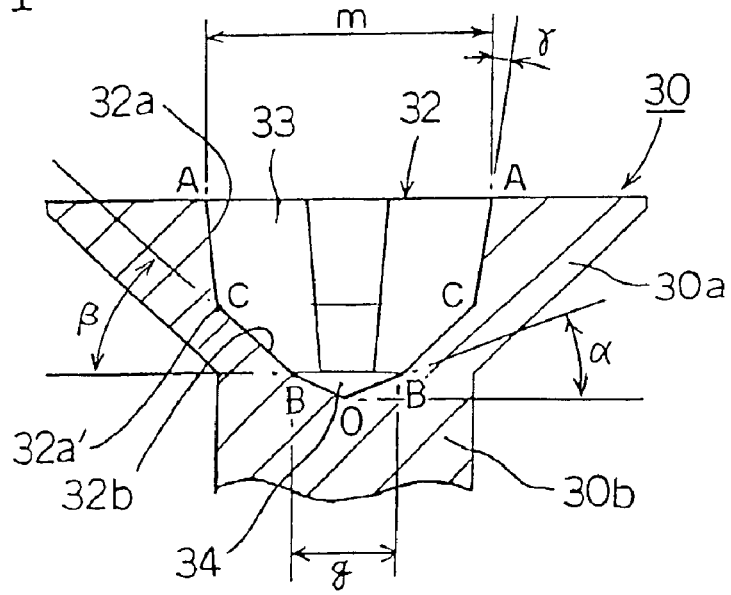
FIG. 1 is an essential sectional side view which shows an embodiment of a screw related to the invention.
Figure 2:
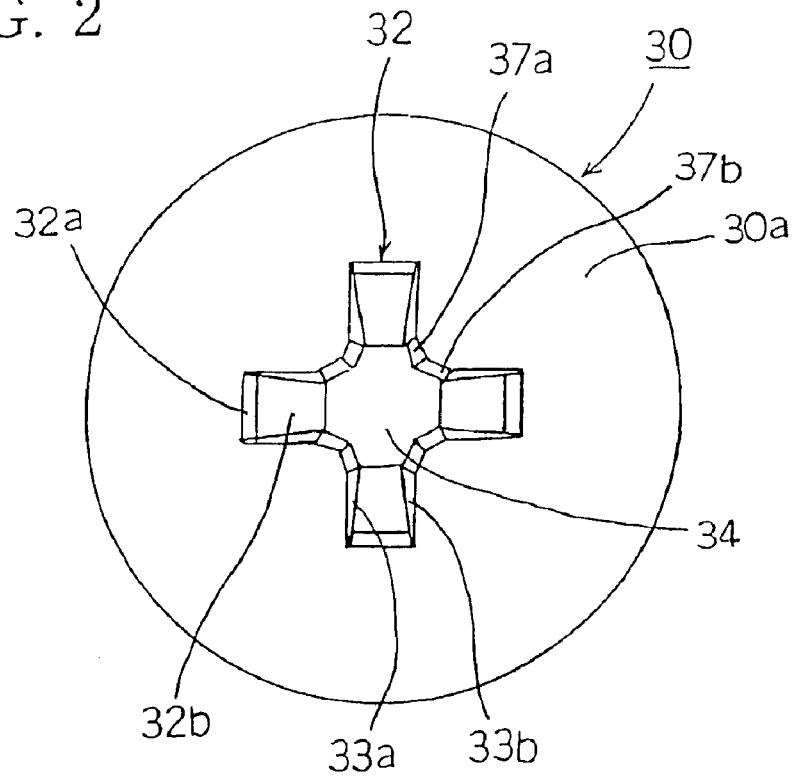
FIG. 2 is a plan view of the head part of the screw shown in FIG. 1.

FIGS. 1 and 2 show an example of a screw related to the invention. That is, in FIGS. 1 and 2, reference numeral 30 denotes the screw related to the invention, and a bit-fitting groove 32 is provided in a head part 30a of this screw 30. Incidentally, this bit-fitting groove 32 is configured as a cross groove which intersects in plus (+) form at the center part of the screw head part 30a.

This bit-fitting groove 32 is constituted by the dimension m of the opening (portion A—A) and the dimension g of the groove bottom part (portion B—B) in accordance with JIS (Japanese Industrial Standard) which have hitherto been publicly known. That is, from the opening end edge part (portion A—A) of the bit-fitting groove 32 to a specified depth are formed end wall parts 32a each having a draft taper (draft angle γ of header punch) of about 1.5° to 5° and a tilted groove part 32b with an inclination angle β of about 45° is formed in the direction from the lower edge part 32a' of this end wall part 32a (portion C—C) to the center part of the screw head part 30a, and a conical bottom face 34 with a gentle inclination angle α of about 28° is then formed in the direction from the point of intersection (portion B—B) between this tilted groove part 32b and the dimension of the bottom part in accordance with JIS to the above-described center part.

Figure 11:
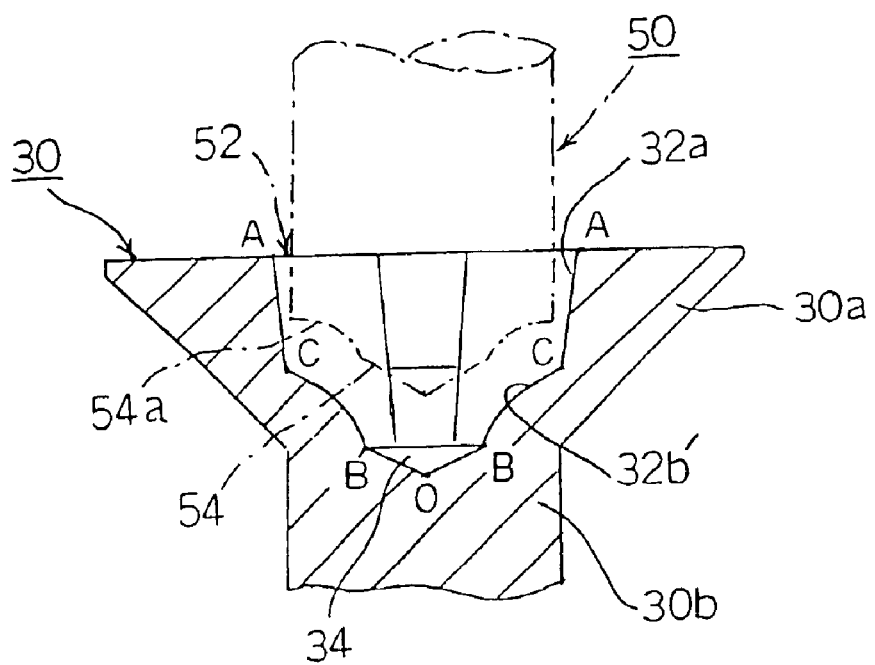
FIG. 11 is an essential sectional side view which shows another embodiment of a screw related to the invention and an outline of the fitting state of a screw driver bit which fits into this screw.

Furthermore, in the screw 30 of this example, as shown in FIG. 2, at the adjacent corner parts of the above-described bit-fitting groove 32 are respectively formed taper connection faces 37a, 37b which extend from the position of the conical bottom face 34 to the opening edge part of the bit-fitting groove 32 in the screw head part 30a in the same manner as with the conventional cross-grooved screw shown in FIG. 11.

EXAMPLE 2

(Example of Structure of Screw 2)

Figure 3:
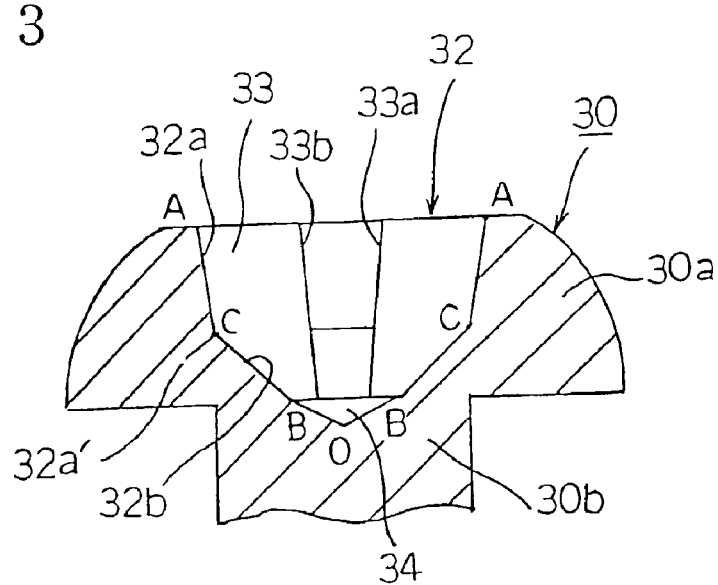
FIG. 3 is an essential sectional side view which shows another embodiment of a screw related to the invention.
Figure 4:
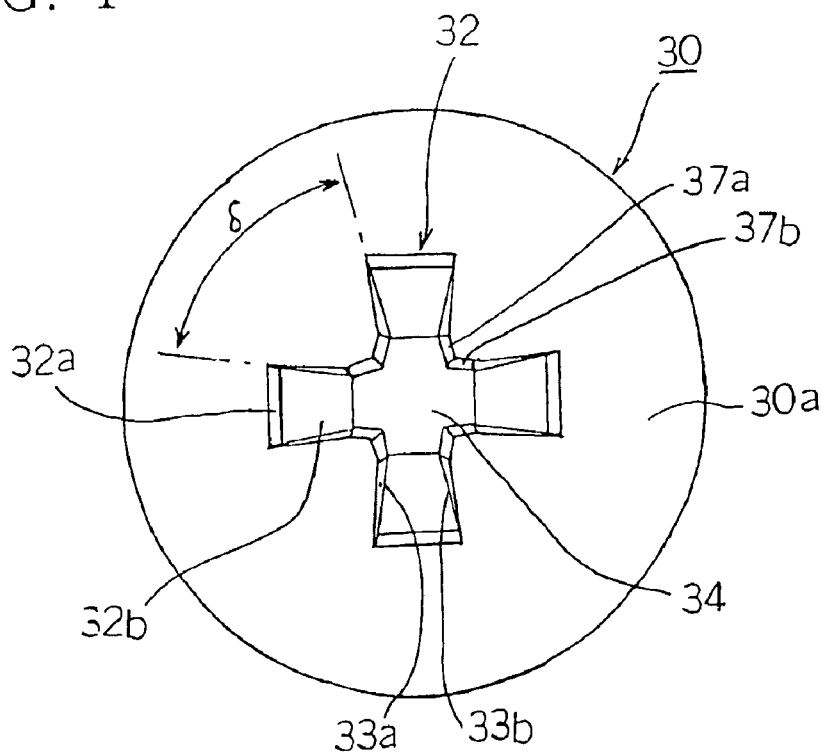
FIG. 4 is a plan view of the head part of the screw shown in FIG. 3.

FIGS. 3 and 4 show another example of a screw related to the invention. That is, in FIG. 4, a screw 30 of this example is such that a screw head part 30a is formed in pan shape and the structure of a bit-fitting groove 23 provided in the screw head part 30a is the same as the bit-fitting groove 23 of the screw 30 whose screw head part 30a is formed in dish shape in the example shown in the above-described FIG. 1. Therefore, the same reference numerals are given to the same component parts and their detailed description is omitted.

However, in the screw 30 of this example, as shown in FIG. 4, in opposed sidewall parts 33 of the bit-fitting groove 32 are formed grooves with a width generally widening toward the end 33a, 33b from the center part of the screw head part 30a outward in the radial direction.

Thus, in the screw 30 of this example, by forming the above-described grooves with a width widening toward the end 33a, 33b, whereby the opening angle δ of opposed side wall parts of each of adjacent grooves is set at a little sharper angle than a right angle (90°), with the result that in a combination with a screw driver bit, which will be described later, the come-out phenomenon of the screw 30 from the bit-fitting groove 32 can be effectively prevented.

EXAMPLE 3
(Example of Structure of Screw 3)

The screw related to the invention is also effective as a plus-and-minus screw (i.e., a screw with a cross grooved and slotted head) that permits the application of a conventional plus screw driver bit and a conventional slotted head screw driver bit. For example, as shown in FIG. 5(a), for a bit-fitting groove 32 into which the leading end of the cutting-edge part of a plus screw driver bit fits, grooves with a width widening toward the end 33a, 33b can be formed in the same manner as with the example shown in the above-described FIG. 4. In this case, the section structure of a plus-and-minus screw 30' is basically the same as described in each example shown in FIGS. 1 and 3 and hence its illustration is omitted. Incidentally, in plus-and-minus screw 30' shown in FIG. 5, one groove 32B in a pair of grooves 32A and 32B that intersect in cross form in the center part of the screw head part 30a is formed as a horizontal groove with a sufficient width and depth so that the groove 32B can abut and engage with the cutting-edge part of the slotted head screw driver bit. Incidentally, the structure of other portions is the same as the structure of the screw head part 30a of the screw 30 shown in the above-described FIG. 4 and, therefore, the same reference numerals are given to the same component parts and their detailed description is omitted.

Also, FIG. 5(b) shows an example of modification of plus-and-minus screw 30' shown in the above-described FIG. 5(a). That is, in plus-and-minus screw 30' of the above-described example, the grooves with a width widening toward the end 33a, 33b, which are formed for the groove 32B that can fit and abut against the cutting-edge part of the slotted head screw driver bit, in a pair of grooves 32A and 32B intersecting in cross form, are configured so as not to exceed the width of the horizontal groove that fits and abuts against the cutting-edge part of the slotted head screw driver bit. Therefore, in this case, the maximum groove width of the grooves with a width widening toward the end 33a, 33b in the above-described groove 32B is configured so as to exceed the width of the above-described horizontal groove, as shown in FIG. 5(b). By configuring the grooves with a width widening toward the end 33a, 33b in this manner, in the engagement thereof against the screw driver bit, which will be described later, the abutting area (driving area) can be increased. Incidentally, in the example of modification of the above-described plus-and-minus screw 30', as indicated by broken lines in FIG. 5(b), also for the other groove 32A, it is possible to provide a horizontal groove capable of fitting and abutting against the cutting-edge part of the slotted head screw driver bit.

Preferred embodiments of the screw related to the invention were described above. The bit-fitting groove 32 of the screw related to the invention is based on the hitherto publicly known dimension m of the opening (portion A—A) and dimension g of the groove bottom part (portion B—B) in accordance with JIS (Japanese Industrial Standard). By positioning the lower edge part 32a' of the end wall part 32a (portion C—C) at a point of intersection between the draft taper angle γ from the opening end edge part (portion A—A) to a specified depth and the inclination angle β of about 45° from a point (portion B—B) which provides the base part of the conical bottom face 34 with a specified gentle inclination angle α, and by providing the tilted groove part 32b set by this positioning, through the application of not only a conventional plus screw driver bit, but also a screw driver bit of a structure which will be described later, it is possible to expand the area in which the screw driver bit can give a rotating driving force to the screw (hereinafter referred to as the driving area) and, at the same time, it is possible, to securely prevent the come-out phenomenon of the screw driver bit and to achieve well-balanced torque transmission to the screw.

In addition, the setting of the inclination angle β of the above-described tilted groove part 32b, particularly in a screw with the screw head part 30a formed in dish shape (refer to FIG. 1), enables the wall thickness of a boundary portion between the screw head part 30a and the screw neck part 30b to be maintained at an appropriate value during the formation of the bit-fitting groove 32 and, therefore, it is possible to sufficiently increase the strength of the screw during a screw tightening operation, thus providing an advantage. Furthermore, when the bit-fitting groove 32 of this shape is formed by means of a header punch, it is possible to keep the life of the above-described header punch long by reducing the wear of the leading end part thereof, thus providing another advantage.

EXAMPLE 4
(Example of Structure of Header Punch for Manufacturing Screws)

Figure 6:
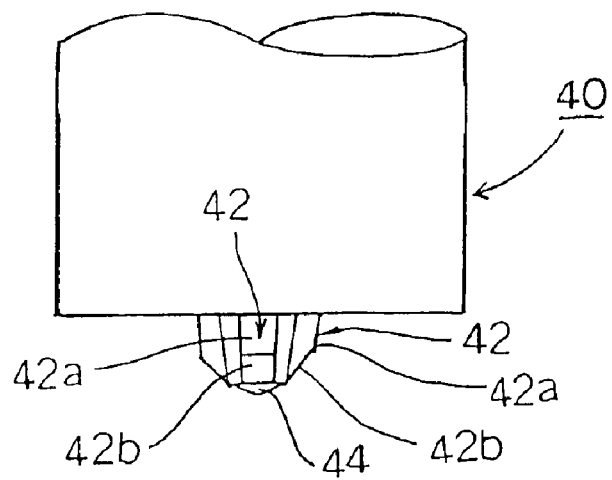
FIG. 6 is an essential side view of a header punch for manufacturing screws for forming the head part of the screw shown in FIG. 1.

FIG. 6 shows an example of a header punch 40 for manufacturing the screw 30 related to the invention in Example 1 shown in FIG. 1. That is, the header punch 40 of this example is intended for use in punching and shaping the bit-fitting groove 32 in the screw head part 30a of the screw 30 shown in FIG. 1. And the header punch 40 of this example is provided with projecting pieces 42 having tilted edge parts 42a, 42b for forming the end wall part 32a with a specified draft angle γ and the tilted groove part 32b with an inclination angle β of about 45° in the end edge part of bit-fitting groove 32 of the screw head part 30a, and has a conical projection 44 for forming the conical bottom face 34 with a gentle inclination angle α of about 28° in the direction from these projecting pieces 42 to the center part of the screw neck part 30b. Incidentally, as header punches for manufacturing the screws shown in the above-described Examples 2 and 3, it is possible to configure specified header punches by making the design change of the shape of the above-described projecting pieces 42 according to the shape of the screws in each example.

EXAMPLE 5
(Example of Structure of Screw Driver Bit)

Figure 7:
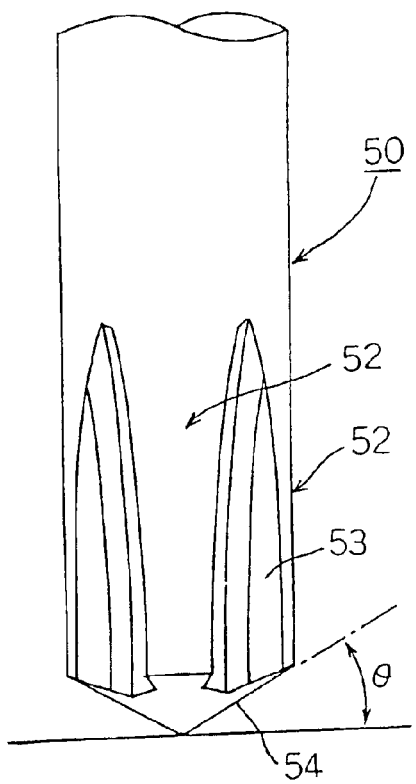
FIG. 7 is an essential enlarged side view which shows an embodiment of a screw driver bit related to the invention.
Figure 8:
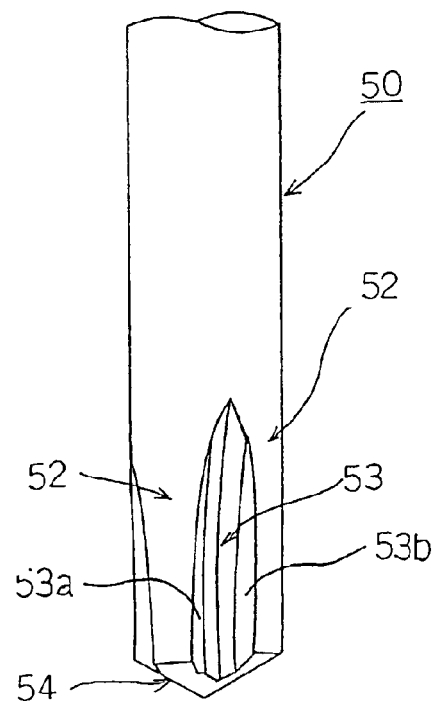
FIG. 8 is an essential enlarged perspective view of the screw driver bit shown in FIG. 7.

FIGS. 7 and 8 show an example of a screw driver bit related to the invention. That is, in FIGS. 7 and 8, reference numeral 50 denotes a main portion of a screw driver bit of this example, and the leading end of the cutting-edge part of this screw driver bit is configured so as to fit into the bit-fitting groove 32 formed as a cross groove in the center part of screw head part 30a of the above-described screw 30 related to the invention.

Therefore, the screw driver bit 50 of this example fits into the bit-fitting groove 32 of the above-described screw 30, is provided with flat cutting-edge parts 52 which respectively engage with the end wall part 32a and tilted groove part 32b formed in the end edge part of this bit-fitting groove 32, and has a conical projection 54 which sets the leading end face of the above-described flat cutting-edge part 52 at an inclination angle θ of about 1° to 45° and preferably 25° to 35° with respect to a horizontal plane according to the tilted groove part 32b and conical bottom part 34, which are formed in the direction from the end wall part 32a of the above-described bit-fitting groove 32 to the center part of the screw neck part 30b.

Incidentally, in FIGS. 7 and 8, reference numeral 53 denotes a generally vertical side wall part, which is formed on both sides of each of the above-described flat cutting-edge part 52 and for which a certain amount of taper is allowed. Therefore, this side wall part 53 abuts and engages against the side wall part 33 formed in the bit-fitting groove 32 of the above-described screw 30. Therefore, the engagement of these driving faces can ensure a sufficiently large engagement area and hence the come-out phenomenon that occurred in a combination of a conventional screw and a conventional screw driver bit can be effectively prevented. Incidentally, in the screw driver bit 50 related to the invention, the side wall part 53 at the leading end of each of the above-described flat cutting-edge parts 52 can be configured in a shape which matches the grooves with a width widening toward the end 33a, 33b in the side wall part 33 formed in the bit-fitting groove 32 of the above-described screw 30, i.e., as side wall parts with a width widening toward the end 53a, 53b (refer to FIG. 8).

Next, connecting operations between the above-described screws 30, 30' related to the invention and the screw driver bit 50 capable of fitting into these screws in a preferred manner will be described below.

Figure 9:
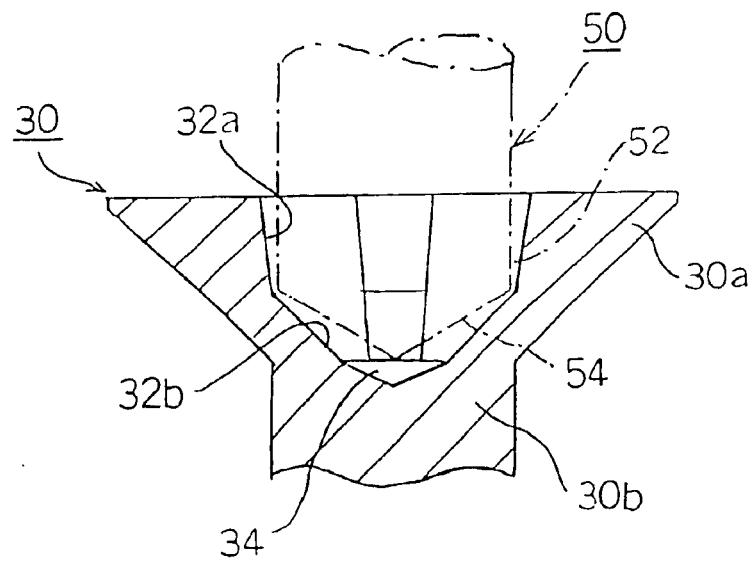
FIG. 9 is an essential enlarged sectional side view which shows how a screw driver bit of the invention fits into the screw shown in FIG. 1.

FIG. 9 shows the connected state between the screw 30 shown in FIG. 1 and the screw driver bit 50 shown in FIG. 7. That is, in this case, as shown in FIG. 9, when the flat cutting-edge part 52 formed at the leading end of the screw driver bit 50 abuts against the bit-fitting groove 32 formed in the screw head part 30a of the screw 30, because of the formation of the leading end face of the flat cutting-edge part 52 as the conical projection 54, the contact with the opening edge part of the above-described bit-fitting groove 32 provides very small contact constituted by a point or a line and, at the same time, the mutual positioning of the center parts is easily and rapidly achieved, whereby the wear of the screw head part 30a and damage thereto are reduced and it becomes possible to rapidly perform an appropriate connection of the screw driver bit 50 to the screw 30.

Figure 10:
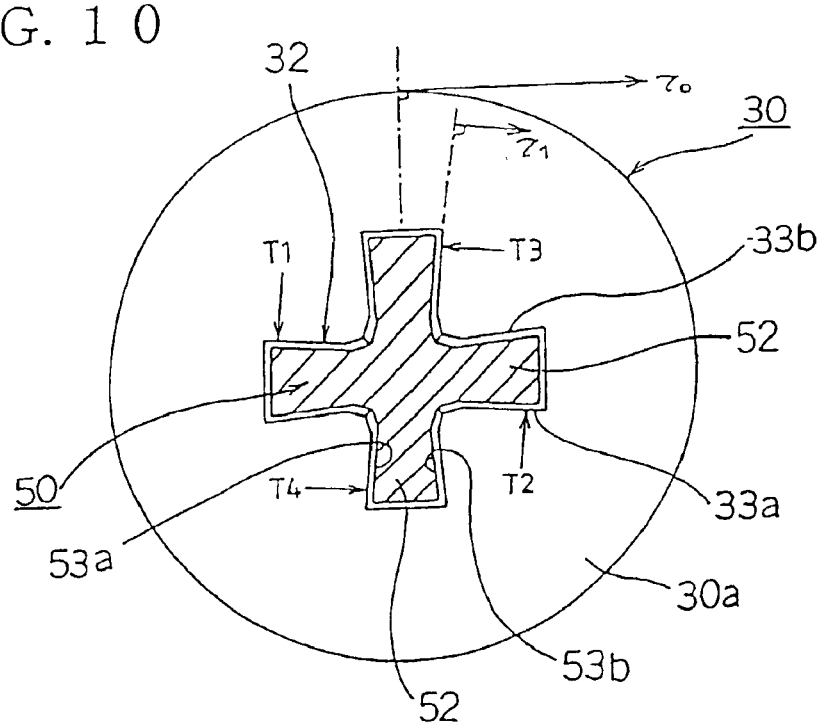
FIG. 10 is an essential enlarged sectional plan view of a screw head part which shows how a screw driver bit of the invention fits into the screw shown in FIG. 4.
Figure 12:
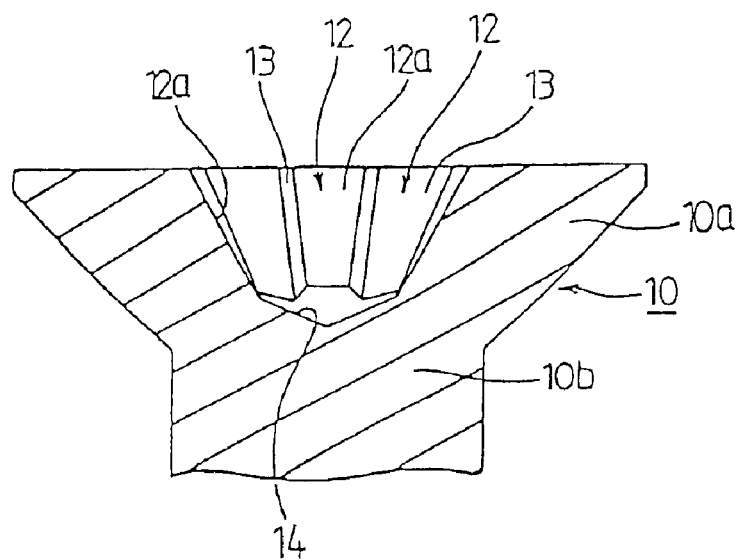
FIG. 12 is an essential sectional side view of a conventional cross-grooved screw.

Also, FIG. 10 shows the connected state between the screw 30 shown in FIG. 4 and the screw driver bit 50 shown in FIG. 8. That is, in this case, as shown in FIG. 10, because the side wall parts 53 at the leading end of the flat cutting-edge parts 52 of the screw driver bit 50 are configured as side wall parts with a width widening toward the end 53a, 53b so as to fit into the grooves with a width widening toward the end 33a, 33b, which are formed in the bit-fitting groove 32 of the screw 30, during the abutment of the cutting-edge part 52 of the screw driver bit 50 against each of the side wall parts (T1, T2, T3, T4) of bit-fitting groove 32 of the screw 30, an appropriate engagement between the screw and the screw driver bit 50 can be achieved by minimizing the clearances between the above-described grooves 33a, 33b and the above-described side wall parts 53a, 53b.

Also, in this case, by setting the opening angle δ (refer to FIG. 4) of opposed side wall parts of each of the adjacent grooves 33a, 33b at a little sharper angle than a right angle, in a screw tightening operation a torque τ1 acting on each of the above-described side walls (T1, T2, T3, T4) can be directed toward the side of the screw neck part 30b from the tangential direction π of the screw head part 30a in which the cutting-edge part 52 of the above-described screw driver bit 50 is fitted and, therefore, the come-out phenomenon of the screw driver bit 50 can be securely prevented and well-balanced torque transmission to the screw 30 can be achieved.

Incidentally, also during the connection between the plus-and-minus screw 30' shown in FIGS. 5(a) and 5(b) and the screw driver bit 50 shown in FIGS. 7 and 8, which is not shown, the same fitting state as described above can be achieved. That is, in this case, as is apparent also from FIGS. 5(a) and 5(b), during the abutment of the cutting-edge part (indicated by broken lines) of the screw driver bit against each of the side wall parts of the bit-fitting groove 32 of the plus-and-minus screw 30', a uniform clearance ε is set at each side wall as shown in FIG. 5(a) and the cutting-edge part can be caused to abut against the side wall parts (T1, T2) of one groove 32A and simultaneously against the side wall parts (T3, T4) of the other groove 32B and well-balanced torque transmission can be achieved. In particular, for the plus-and-minus screw 30' shown in FIG. 5(b), it is possible to increase the abutting area (driving area) of the cutting-edge part of the screw driver bit against the side wall parts (T3, T4) of the above-described groove 32B and this provides the advantage that better-balanced torque transmission can be achieved and the like.

Also, in the case where the side wall parts 53 at the leading end of the flat cutting-edge parts 52 of the screw driver bit 50 are configured as side wall parts with a width widening toward the end 53a, 53b so as to fit into the grooves with a width widening toward the end 33a, 33b, which are formed in the bit-fitting groove 32 of the above-described plus-and-minus screw 30' (refer to FIG. 8), during the abutment of the cutting-edge part 52 of this screw driver bit 50 against each of the side wall parts of bit-fitting groove 32 of the plus-and-minus screw 30', an appropriate engagement between the plus-and-minus screw 30' and the screw driver bit can be achieved by eliminating the clearance ε as shown in FIG. 5.

EXAMPLE 6

(Example of Modifications of Screw and Screw Driver Bit)

FIG. 11 shows an example of modifications of the screw related to the invention shown in FIG. 1 and of the screw-driver bit shown in FIG. 7. That is, in FIG. 11, for the structure of the tilted groove part 32b with an inclination angle β of about 45°, which is formed in the direction from the lower edge part 32a' of the end edge part 32a of bit-fitting groove 32 of the screw 30 shown in FIG. 1 to the conical bottom face 34 at the center part of the screw neck part 30b, the above-described tilted groove part is bulged 32b' in curved form inward to the bit-fitting groove 32. In contrast, for the structure of the conical projection 54 formed at the leading end of the cutting-edge part 52 at the leading end of the screw driver bit 50 shown in FIG. 7, in a portion of the above-described projection 54 is formed a concavity 54a in curved form so as to fit on the bulge 32b' in curved form in the tilted groove part of the above-described screw 30.

Also in a combination of the screw and screw driver bit of this example thus configured, it is possible not only to effectively prevent the come-out phenomenon of the screw driver bit, but also to increase the strength of the screw. At the same time, this provides advantages including the advantage that the life of the header punch for manufacturing the screw can be extended.

The preferred embodiments of the invention were described above. It is needless to say, however, that the invention is not limited to the above-described examples and that it is possible to make many design changes so long as they do not depart from the spirit of the invention.

Advantages of the Invention

As is apparent from the above-described examples, the screw related to the invention is formed so that a bit-fitting groove formed of a cross groove is provided in a screw head part, a specified tilted groove part is formed in the direction from the end edge part of the bit-fitting groove to the center part of a screw neck part, and a roughly conical bottom face is formed at a cross center part, which is characterized in that the end edge part of the above-described bit-fitting groove is formed as a generally vertical end wall part of a specified depth, that a groove part with an inclination angle β of about 45° is formed in the direction from the lower edge part of the end wall part to the conical bottom face at the center part of the screw neck part, and further that the conical bottom face is formed with a gentle inclination angle α of approximately 28°. This structure provides many excellent advantages: for example, the strength of the screw can be sufficiently increased during a screw tightening operation and, at the same time, the wear of the leading end part of the header punch is reduced during the manufacturing of the screw, a conventional plus screw driver bit can be used, the come-out phenomenon of the screw driver bit during a screw tightening operation is securely prevented, and a well-balanced torque transmission to the screw can be achieved.

And according to the combination of the screw and screw driver bit related to the invention, the screw driver bit is provided, at the leading end thereof, with a flat cutting-edge part in which is formed a generally vertical end edge part that fits along a generally vertical end wall part of a bit-fitting groove of a screw head part, and the leading end face of this cutting-edge part is formed as a conical projection having an inclination angle of about 1° to 45° with respect to a horizontal plane so as to fit into the above-described screws related to the invention. The structure of this screw driver bit provides many excellent advantages: for example, the driving area of the screw driver bit relative to the screw can be expanded, whereby the come-out phenomenon of the screw driver bit can be securely prevented and, at the same time, a well-balanced torque transmission to the screw is achieved, with the result that a rapid screw tightening operation and an improvement in the operation efficiency can be easily achieved.

Figure 13:
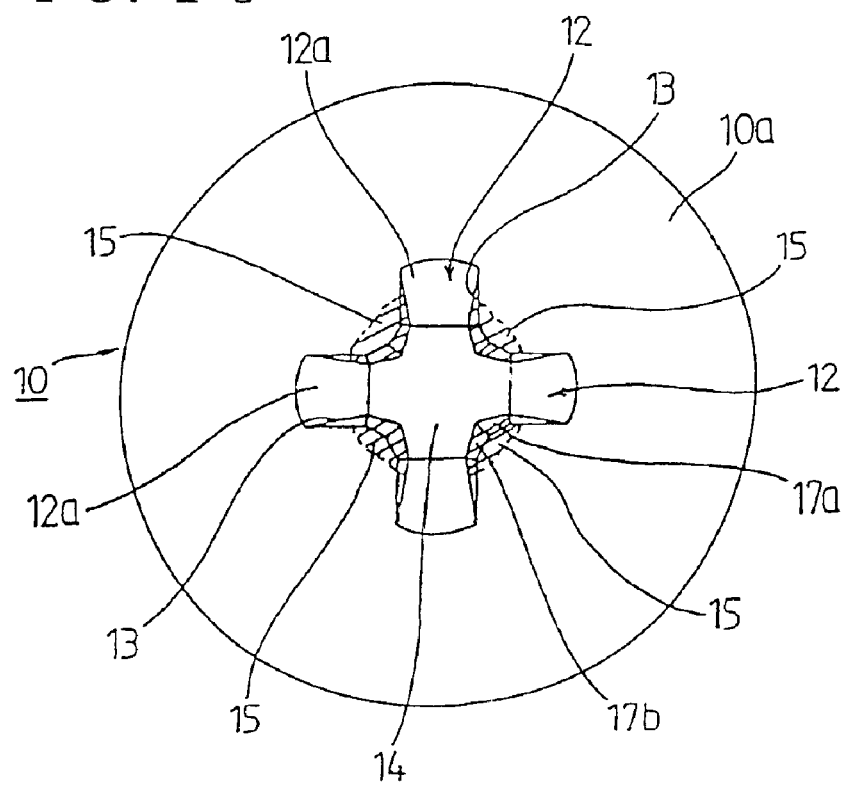
FIG. 13 is a plan view of the head part of the cross-grooved screw shown in FIG. 12.
Figure 14:
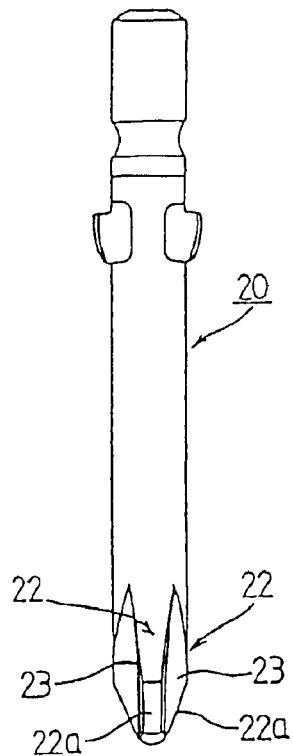
FIG. 14 is an essential side view of a screw driver bit for conventional cross-grooved screws.
Figure 15:
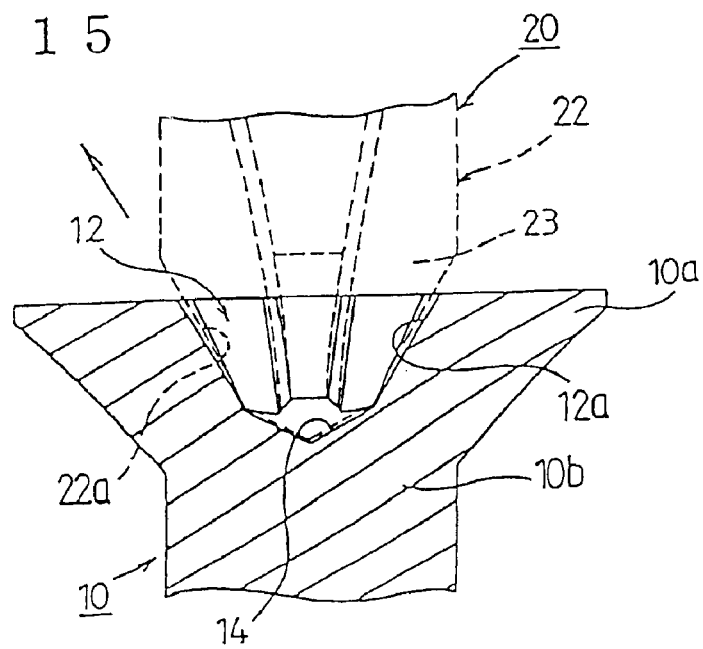
FIG. 15 is an essential sectional side view which shows the connected state between the screw shown in FIG. 12 and the screw driver bit shown in FIG. 14.

Incidentally, the screw related to the invention is configured so that basically, the taper contact area relative to the whole of the bit-fitting groove is partial and small in the engagement with the screw driver bit, and besides the area of the side wall part of the bit-fitting groove against which the side wall part of the leading end of the screw driver bit abuts is expanded. As a result, an appropriate screw tightening operation and an appropriate screw removal operation can be achieved without causing damage (reference numeral 15) to a portion of the bit-fitting groove, for example as shown in FIG. 13, and without causing the come-out phenomenon.

Also, according to the combination of the screw and screw driver bit related to the invention, the screw driver bit can be rotated by ensuring fitting with the axis of the screw and the axis of the screw driver bit always kept in a coaxial state. Therefore, a screw tightening operation by an appropriate torque can always be achieved rapidly by smoothly transmitting a rotating force of the screw driver bit to the screw without causing the come-out phenomenon and damage to the screw etc.

In other words, by using the combination of the screw and screw driver bit related to the invention, it is possible not only to always perform a secure screw tightening operation by giving an appropriate torque to an object constituted by various types of hard and soft materials, to which the screw is to be attached, but also to substantially reduce damage to the screw, whereby an improvement in the safety of a screw tightening operation and the working efficiency can be easily and economically achieved.

I claim:

1. A screw, comprising:

a screw shaft;

a screw head part defining a head surface that extends in substantially an orthogonal direction with respect to a longitudinal axis of the screw shaft;

a cross-shaped bit-fitting groove including respective groove portions that intersect in a center section of the head surface;

said bit-fitting groove including an end wall part that extends from the head surface of the screw head part to a prescribed depth in the screw head part, said end wall part having a draft taper γ of about 1.5° to about 5° with respect to a vertical plane parallel to said longitudinal axis of the screw shaft;

said bit-fitting groove further including an inclined groove part directed from a lower edge part of said end wall part toward a center of the bit-fitting groove, said inclined groove part being formed with an angle of inclination β of approximately 45° with respect to a horizontal plane orthogonal to said longitudinal axis of the screw shaft;

said bit-fitting groove further including a conical bottom surface formed with a gentle inclination angle α of approximately 28° with respect to said horizontal plane and extending from said inclined groove part to a bottom of the bit-fitting groove at the center thereof; and said groove portions having a width defined by opposed side wall parts expanding in a radial direction outward from the center section of the screw head part such that an angle of opening δ between the opposed side wall parts of each of adjacent ones of said groove portions which is slightly sharper than a right angle.

2. A plus-minus screw, comprising:

a screw shaft;

a screw head part defining a head surface that extends in substantially an orthogonal direction with respect to a longitudinal axis of the screw shaft;

a cross-shaped bit-fitting groove including respective groove portions that intersect in a center section of the head surface;

said bit-fitting groove including an end wall part that extends from the head surface of the screw head part to a prescribed depth in the screw head part, said end wall part having a draft taper γ of about 15° to about 5° with respect to a vertical plane parallel to said longitudinal axis of the screw shaft;

said bit-fitting groove further including an inclined groove part directed from a lower edge part of said end wall part toward a center of the bit-fitting groove, said inclined groove part being formed with an angle of inclination β of approximately 45° with respect to a horizontal plane orthogonal to said longitudinal axis of the screw shaft;

said bit-fitting groove further including a conical bottom surface formed with a gentle inclination angle α of approximately 28° with respect to said horizontal plane and extending from said inclined groove part to a bottom of the bit-fitting groove at the center thereof;

said groove portions having a width defined by opposed side wall parts expanding in a radial direction outward from the center section of the screw head part such that an angle of opening δ between the opposed side wall parts of each of adjacent ones of said groove portions which is slightly sharper than a right angle; and at least one of the groove portions that intersect in the center section of said head surface is configured as a horizontal groove into which a bit blade of a minus screw driver insertingly engages.

3. A combination of a screw and a driver bit, comprising:

the screw, including:
  a screw shaft;
  a screw head part defining a head surface that extends in substantially an orthogonal direction with respect to a longitudinal axis of the screw shaft;
  a cross-shaped bit-fitting groove including respective groove portions that intersect in a center section of the head surface;
  said bit-fitting groove including an end wall part that extends from the head surface of the screw head part to a prescribed depth in the screw head part, said end wall part having a draft taper γ of about 1.5° to about 5° with respect to a vertical plane parallel to said longitudinal axis of the screw shaft;
  said bit-fitting groove further including an inclined groove part directed from a lower edge part of said end wall part toward a center of the bit-fitting groove, said inclined groove part being formed with an angle of inclination β of approximately 45° with respect to a horizontal plane orthogonal to said longitudinal axis of the screw shaft; and
  said bit-fitting groove further including a conical bottom surface formed with a gentle inclination angle α of approximately 28° with respect to said horizontal plane and extending from said inclined groove part to a bottom of the bit-fitting groove at the center thereof; and
  said groove portions having a width defined by opposed side wall parts expanding in a radial direction outward from the center section of the screw head part such that an angle of opening δ between the opposed side wall parts of each of adjacent ones of said groove portions which is slightly sharper than a right angle; and the driver bit, including:
  a flat driver blade part configured so as to be engageable with the bit-fitting groove of the screw head part along the end wall part of thereof and having a substantially vertical driver side wall part having a driver tip part formed to expand outwardly; and
  a flat driver blade part tip formed as a conical projection having at least one side surface inclining at an angle of inclination θ of between about 25° and about 35° with respect to the horizontal plane.

4. A combination of plus-minus screw, a flat blade and a driver bit, the combination comprising the screw, including:
  a screw shaft;
  a screw head part defining a head surface that extends in substantially an orthogonal direction with respect to a longitudinal axis of the screw shaft;
  a cross-shaped bit-fitting groove including respective groove portions that intersect in a center section of the head surface;
  said bit-fitting groove including an end wall part that extends from the head surface of the screw head part to a prescribed depth in the screw head part, said end wall part having a draft taper γ of about 1.5° to about 5° with respect to a vertical plane parallel to said longitudinal axis of the screw shaft;
  said bit-fitting groove further including an inclined groove part directed from a lower edge part of said end wall part toward a center of the bit-fitting groove, said inclined groove part being formed with an angle of inclination β of approximately 45° with respect to a horizontal plane orthogonal to said longitudinal axis of the screw shaft; and
  said bit-fitting groove further including a conical bottom surface formed with a gentle inclination angle α of approximately 28° with respect to said horizontal plane and extending from said inclined groove part to a bottom of the bit-fitting groove at the center thereof;
  said groove portions having a width defined by opposed side wall parts expanding in a radial direction outward from the center section of the screw head part such that an angle of opening δ between the opposed side wall parts of each of adjacent ones of said groove portions which is slightly sharper than a right angle; and
  at least one of the groove portions that intersect in the center section of said head surface is configured as a horizontal groove into which a bit blade of a minus screw driver insertingly engages the flat blade, including:
  a flat blade part being configured so as to be engageable with the bit-fitting groove of the screw head part along the end wall part thereof and having a substantially vertical side wall part having a tip part formed so as to expand outwardly; and the driver bit, including:
  a flat driver blade part configured so as to be engageable with the bit-fitting groove of the screw head part along the end wall part of thereof and having a substantially vertical driver side wall part having a driver tip part formed to expand outwardly; and
  a flat driver blade part tip formed as a conical projection having at least one side surface inclining at an angle of inclination θ of between about 25° and about 35° with respect to the horizontal plane.

5. A screw, comprising:
a screw shaft;
a screw head part defining a head surface that extends in substantially an orthogonal direction with respect to a longitudinal axis of the screw shaft;
a cross-shaped bit-fitting groove including respective groove portions that intersect centrally of the head surface;
said bit-fitting groove including an end wall part that extends from the head surface of the screw head part to a prescribed depth in the screw head part, said end wall part having a draft taper γ of about 1.5° to about 5° with respect to a vertical plane parallel to said longitudinal axis of the screw shaft;
said bit-fitting groove further including an inclined groove part directed from a lower edge part of said end wall part toward a center of the bit-fitting groove, said inclined groove part being formed with an angle of inclination β of approximately 45° with respect to a horizontal plane orthogonal to said longitudinal axis of the screw shaft; and said bit-fitting groove further including a conical bottom surface formed with a gentle inclination angle $\alpha$ which is less than said angle of inclination $\beta$ with respect to said horizontal plane, said conical bottom surface extending from said inclined groove part to a bottom of the bit-fitting groove at the center thereof.

6. A screw according to claim 5, wherein said groove portions have a width defined by opposed side wall parts which expands in a radial direction outward from the center section of the screw head part such that an angle of opening $\delta$ between the opposed side wall parts of each of adjacent ones of said groove portions which is slightly sharper than a right angle.

7. A screw according to claim 5, wherein said inclined groove part is bulged in a curved form inward of the bit-fitting groove.

8. A screw according to claim 5, wherein said gentle inclination angle $\alpha$ is approximately 28° with respect to said horizontal plane.

* * * * *